United States Patent
Wang et al.

(10) Patent No.: US 8,777,491 B2
(45) Date of Patent: Jul. 15, 2014

(54) BEARING ASSEMBLY WITH SPLASH PROTECTION

(75) Inventors: Wenshui Wang, Shanghai (CN); Robert G. Sutherlin, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 64 days.

(21) Appl. No.: 13/238,012

(22) Filed: Sep. 21, 2011

(65) Prior Publication Data

US 2013/0069332 A1    Mar. 21, 2013

(51) Int. Cl.
*F16C 13/00* (2006.01)
*F16C 33/80* (2006.01)
*F16C 33/76* (2006.01)

(52) U.S. Cl.
USPC ............ 384/544; 384/480; 384/485; 384/589

(58) Field of Classification Search
USPC ......... 384/477, 480, 481, 482, 484, 485, 486, 384/489, 544, 589; 277/345, 353, 423, 549, 277/551
See application file for complete search history.

(56) References Cited

U.S. PATENT DOCUMENTS

| 4,179,167 | A | * | 12/1979 | Lura et al. ....................... 384/512 |
| 4,958,944 | A | * | 9/1990 | Hofmann et al. ............. 384/512 |
| 5,011,233 | A | * | 4/1991 | Nomura et al. ............. 301/108.1 |
| 6,217,220 | B1 | | 4/2001 | Ohkuma et al. |
| 6,854,893 | B2 | * | 2/2005 | Schmidt ......................... 384/486 |
| 7,350,976 | B2 | * | 4/2008 | Ohtsuki et al. ................ 384/448 |
| 2002/0181817 | A1 | * | 12/2002 | Novak et al. .................. 384/477 |
| 2004/0228556 | A1 | * | 11/2004 | Ohtsuki et al. ................ 384/448 |
| 2010/0054644 | A1 | * | 3/2010 | Takada .......................... 384/477 |
| 2010/0104231 | A1 | * | 4/2010 | Norimatsu .................... 384/448 |
| 2010/0111457 | A1 | * | 5/2010 | Walter et al. .................. 384/448 |

FOREIGN PATENT DOCUMENTS

DE    102011004422 A1    8/2012

* cited by examiner

Primary Examiner — Thomas R Hannon
Assistant Examiner — Adam D Rogers

(57) ABSTRACT

A wheel bearing assembly includes a wheel hub, a knuckle member defining a bore, and a bearing arranged in the bore and configured to rotatably support the wheel hub. The bearing includes a seal member configured to cover internal workings of the bearing. The wheel bearing assembly also includes an annular slinger arranged on the wheel hub and configured to at least partially screen the seal member to minimize ingestion of contaminants by the bearing from the ambient. The wheel bearing assembly additionally includes an annular shield configured to at least partially shield the slinger from the contaminants and generate a labyrinth path from the ambient to the seal member for any of the contaminants. A vehicle employing the above described wheel bearing assembly is also disclosed.

18 Claims, 3 Drawing Sheets

BEARING ASSEMBLY WITH SPLASH PROTECTION

TECHNICAL FIELD

The present disclosure relates to a bearing assembly with splash protection.

BACKGROUND

Contemporary on- and off-road going vehicles typically employ suspension systems that include a variety of bearings for supporting drive shafts and other rotating members. During operation of the vehicle, such bearings may be exposed to various contaminants, such as road debris and slurry. Such contaminants may impact the bearing and penetrate the bearing's outer construction, which, in turn, may cause corrosion and other damage to the bearing's inner workings and negatively impact the bearing's performance and reliability. Accordingly, it may be desirable to protect the bearing's internal components, such as seals, races, and balls or rollers from possible contamination and damage from such potential damage.

SUMMARY

A wheel bearing assembly includes a wheel hub, a knuckle member defining a bore, and a bearing arranged in the bore and configured to rotatably support the wheel hub. The bearing includes a seal member configured to cover internal workings of the bearing. The wheel bearing assembly also includes an annular slinger arranged on the wheel hub and configured to at least partially screen the seal member to minimize ingestion of contaminants by the bearing from the ambient. The wheel bearing assembly additionally includes an annular shield configured to at least partially shield the slinger from the contaminants and generate a labyrinth path from the ambient to the seal member for any of the contaminants.

The wheel bearing assembly may also include a drain passage defined by the shield and configured to permit the contaminants that enter the shield to be expelled to the ambient.

The annular shield may be retained between the bearing and the knuckle member.

The wheel hub may include a roll form configured to retain the bearing on the wheel hub. In such a case, the annular slinger may be pressed onto the roll form.

The slinger may include a plurality of tabs that are configured to snap onto the wheel hub.

The bearing may include an outer race and an inner race, and the wheel hub may at least partially constitute the inner race.

The seal member may be arranged between the inner race and the outer race.

The wheel bearing assembly may include an annular polymeric lip configured to extend between the slinger and the shield. Such a polymeric lip may be fixed relative to one of the slinger and the shield. Accordingly, the polymeric lip may be in contact with each of the slinger and the shield, and be formed from a low friction compound, such that drag between the slinger and the shield is minimized.

A vehicle employing the above described wheel bearing assembly is also disclosed.

The above features and advantages and other features and advantages of the present invention are readily apparent from the following detailed description of the best modes for carrying out the invention when taken in connection with the accompanying drawings.

DETAILED DESCRIPTION

Figure 1:
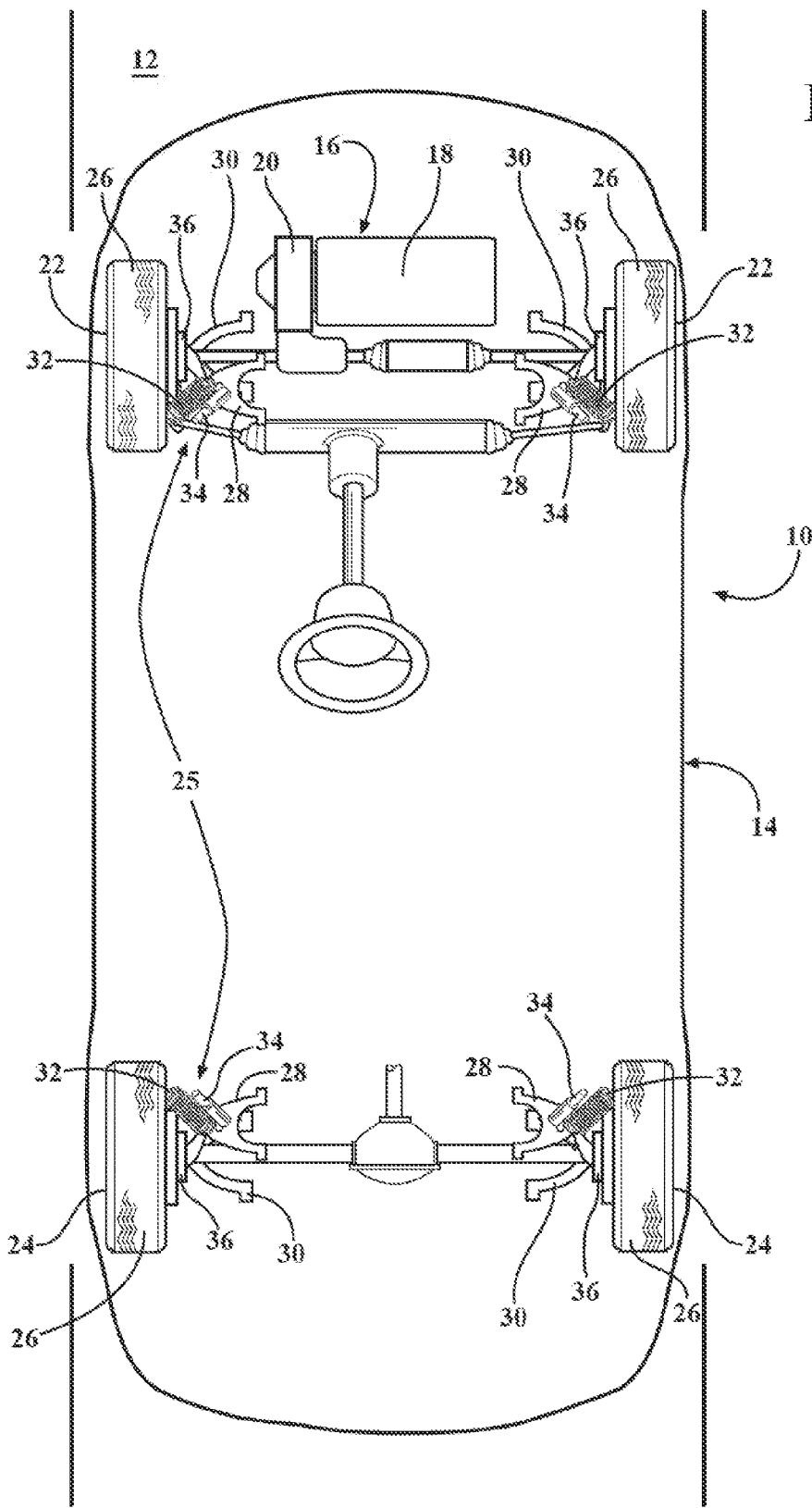
FIG. 1 is a schematic top view of a motor vehicle equipped with a suspension system including a wheel bearing assembly.

Referring to the drawings, wherein like reference numbers refer to like components, FIG. 1 shows a schematic view of a motor vehicle 10 positioned relative to a road surface 12. The vehicle includes a vehicle body 14. The vehicle 10 also includes a powertrain 16 configured to propel the vehicle. As shown in FIG. 1, the powertrain 16 may include an engine 18, a transmission 20, as well as one or more motor/generators (not shown).

The vehicle 10 also includes a plurality of wheels 22 and 24. Each of the plurality of wheels 22, 24 includes an inflatable tire 26 mounted thereon. Although four wheels 22, 24 with tires 26 are shown in FIG. 1, a vehicle with fewer or greater number of wheels and tires is also envisioned. Depending on specific configuration of the powertrain 16, power of the engine 18 may be transmitted to the road surface 12 through the wheels 22, the wheels 24, or through all the wheels 22 and 24.

As shown in FIG. 1, a vehicle suspension system 25 operatively connects the body 14 to the wheels 22, 24 for maintaining contact between the wheels and the road surface 12, and for maintaining handling of the vehicle 10. As shown, the suspension system 25 may include a plurality of upper control arms 28 and lower control arms 30, wherein one upper and one lower control arm is connected to one of the wheels 22, 24. Although a specific configuration of the suspension system 25 is shown in FIG. 1, other vehicle suspension designs are similarly envisioned. The suspension system 25 also includes springs 32 and dampers 34. Each spring 32 and damper 34 is configured to control deflection of the respective wheel 22, 24 as the vehicle 10 traverses the road surface 12 and the subject wheel's subsequent rebound.

Figure 2:
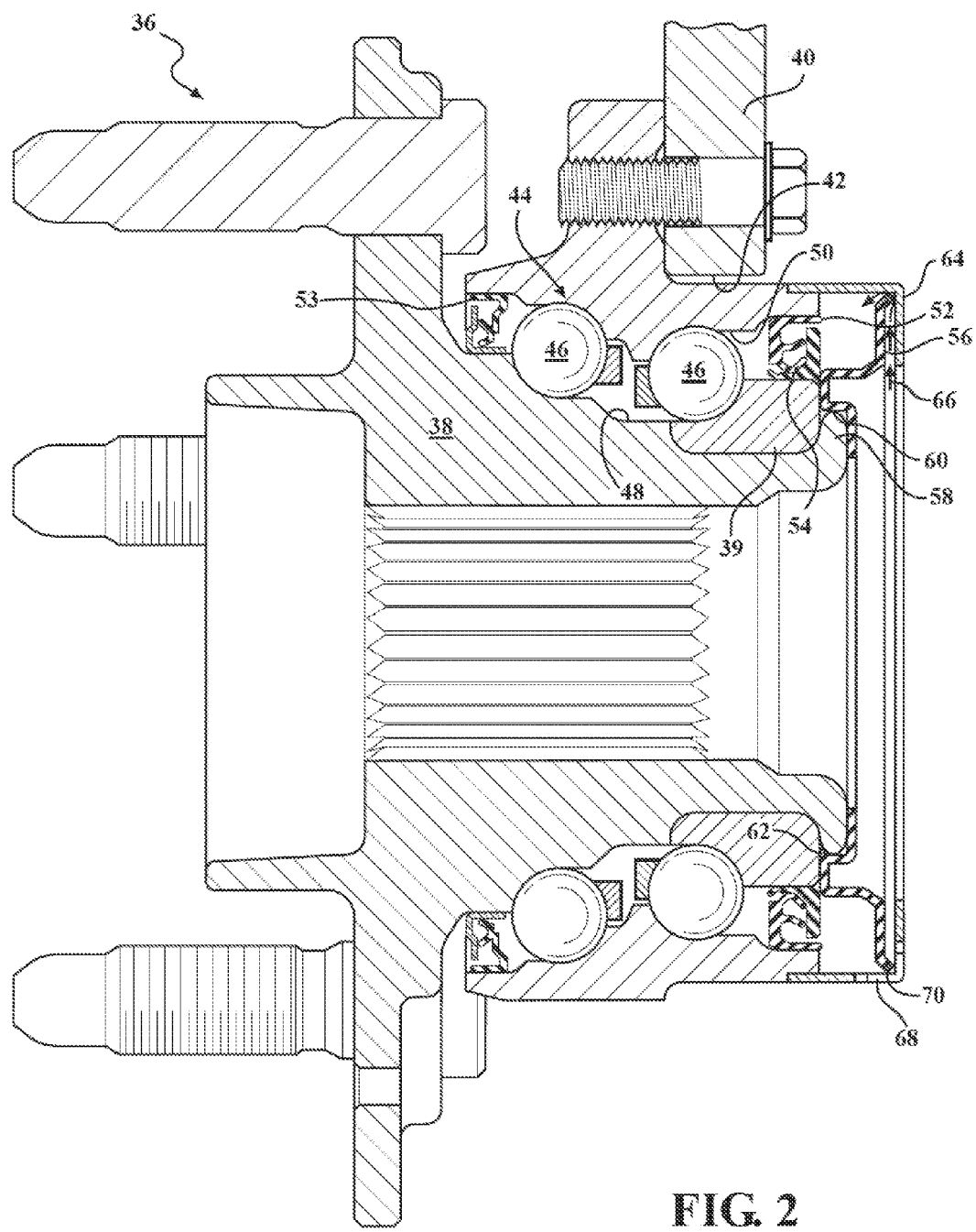
FIG. 2 is schematic cross-sectional view of the wheel bearing assembly shown in FIG. 1, the wheel bearing assembly being illustrated as having a slinger and a shield defining a drain passage.

As shown in FIG. 1, each respective wheel 22, 24 may include a wheel bearing assembly 36. As seen in FIG. 2, the wheel bearing assembly 36 operatively connects one of the wheels 22, 24 to the vehicle body 14. The wheel bearing assembly 36 includes a wheel hub 38 configured to be attached to one of the wheels 22, 24. The wheel bearing assembly 36 also includes a knuckle member 40 that is supported by the vehicle body 14. The knuckle member 40 defines a bore 42. As shown, the bore 42 is formed through the knuckle member 40. A bearing 44 is arranged in the bore 42 and is configured to rotatably support the wheel hub 38. The bearing 44 includes a plurality of balls 46 that is configured to roll between inner and outer races 48, 50 in grease that is specially formulated to reduce friction between the balls and the races during operation of the bearing. Typically, lubricating properties of the grease are negatively impacted by contaminants, such as sand and salt that may be prevalent in the ambient environment. Such contaminants may be carried onto the bearing 44 by a slurry splashed from the road surface 12.

With continued reference to FIG. 2, the bearing assembly 36 includes an inner ring 39, which together with the wheel hub 38 constitutes the inner race 48. To maintain consistent rolling friction and reliability of the bearing 44, the bearing also includes a seal member 52 and a seal member 53 arranged between the inner and outer races 48, 50. The seal members 52 and 53 are configured to cover internal workings of the bearing, such as the balls 46 and ball contact surfaces of the inner and outer races 48, 50. The seal member 52 includes at least one lip 54 that is employed to retain the grease inside the bearing 44 and prevent access of the bearing's internal workings by various contaminants and road debris. The seal members 52, 53 are typically fixed to either the inner race 48 or the outer race 50 such that the lip 54 is arranged in sliding contact with the other of the two races 48, 50 during operation of the bearing 44. Typically, the seal members 52, 53 are molded from a specially formulated polymer that is configured to retain elastic properties over a wide range of temperatures and withstand contact with various chemicals that are used in the vehicle 10.

As may be seen in FIG. 2, the wheel bearing assembly 36 also includes an annular slinger 56. The slinger 56 may be formed from a high strength material, such as steel, in order to withstand impacts from rocks that may be thrown from the road surface 12 toward the bearing 44 while the vehicle 10 is in motion. The slinger 56 is arranged on the wheel hub 38 and is configured to at least partially screen the seal member 52 to minimize ingestion of contaminants and debris by the bearing 44 from the ambient. As shown, the wheel hub 38 includes a roll form 58 that is configured to retain the bearing 44 on the wheel hub 38. The roll form 58 also provides a surface 60 that the slinger 56 is pressed onto, thereby being retained thereon via an interference fit. Accordingly, the slinger 56 is fixed to the wheel hub 38 for concurrent rotation with the inner race 48. As shown, the slinger 56 may include a plurality of tabs 62 that are arranged concentrically around the inner diameter of the slinger and configured to snap onto the roll form 58, as such enhancing the interference fit. The actual number of tabs 62 may be three or greater, depending on, for example, the material selected for the slinger 56.

As shown in FIG. 2, the wheel bearing assembly 36 additionally includes an annular shield 64 that is configured to at least partially shield the slinger 56 from the contaminants and road debris. The shield 64 is pressed onto the outer race 50 of the bearing 44. Accordingly, the shield 64 is purposefully fixed to the outer race 50 such that the shield may rotate relative to the slinger 56 during operation of the bearing 44. Similar to the slinger 56, the shield 64 may be formed from a high strength material, such as steel, in order to withstand impacts from rocks thrown from the road surface 12. The combined arrangement of the slinger 56 and the shield 64 generate a labyrinth path 66 from the ambient to the seal member 52. The labyrinth path 66 serves to prevent straight access to the seal member 52 from the ambient for any of the contaminants.

Figure 3:
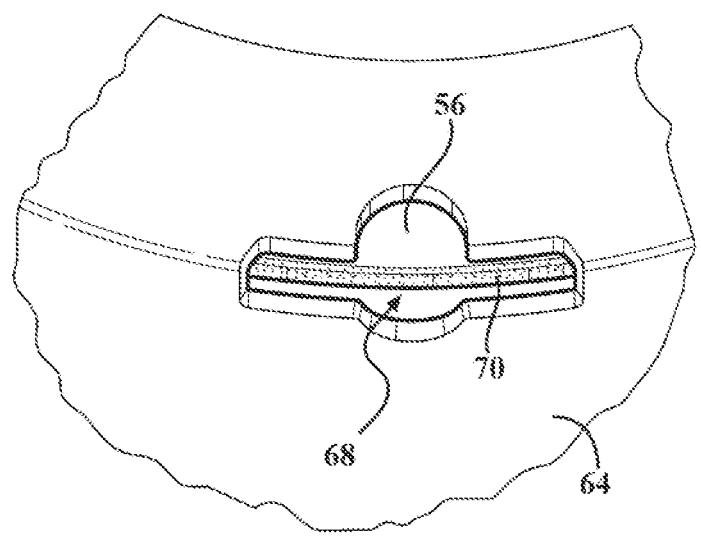
FIG. 3 is a schematic perspective close up view of the drain passage defined by the shield that is shown in FIG. 2.

As shown in FIGS. 2 and 3, the wheel bearing assembly 36 also includes a drain passage 68. The drain passage 68 is defined by the shield 64 and is configured to permit the contaminants that succeed in entering the shield to return to the ambient prior to accessing the seal member 52. When the wheel bearing assembly 36 is viewed in its as-installed position in the vehicle 10, the drain passage 68 is arranged on the bottom of the shield 64. Such arrangement of the drain passage 68 permits liquid-borne contaminants that enter the shield to not be trapped between the shield 64 and the seal member 52, but be expelled to the ambient via gravity.

To assist with maintaining liquid-borne contaminants in the vicinity of the drain passage 68, the wheel bearing assembly 36 may include an annular polymeric lip 70 configured to extend between the slinger 56 and the shield 64 (shown in FIG. 2). As shown, the lip 70 may be fixed relative to the slinger 56 or to the shield 64 (not shown). The lip 70 may be formed from a low friction compound, for example DuPont Teflon or Vespel, such that drag between the slinger 56 and the shield 64 is minimized. Accordingly, the low friction nature of the selected compound may permit the lip 70 to be in actual physical contact with the shield 64, or, if fixed to the shield, in physical contact with the slinger 56, during operation of the vehicle 10, without incurring a significant drag penalty.

While the best modes for carrying out the invention have been described in detail, those familiar with the art to which this invention relates will recognize various alternative designs and embodiments for practicing the invention within the scope of the appended claims.

The invention claimed is:

1. A wheel bearing assembly comprising:
   a wheel hub;
   a knuckle member defining a bore;
   a bearing arranged in the bore and configured to rotatably support the wheel hub, and having a seal member configured to cover internal workings of the bearing;
   an annular slinger arranged on the wheel hub and configured to at least partially screen the seal member to minimize ingestion of contaminants by the bearing from the ambient; and
   an annular shield configured to at least partially shield the annular slinger from the contaminants and generate a labyrinth path from the ambient to the seal member for any of the contaminants;
   wherein the wheel hub includes a roll form configured to retain the bearing on the wheel hub and the annular slinger is attached to the roll form via an interference fit.

2. The wheel bearing assembly of claim 1, further comprising a drain passage defined by the annular shield and configured to permit the contaminants that enter the annular shield to be expelled to the ambient.

3. The wheel bearing assembly of claim 1, wherein the annular shield is retained between the bearing and the knuckle member.

4. The wheel bearing assembly of claim 1, wherein the annular slinger includes a plurality of tabs that are configured to snap onto the roll form.

5. The wheel bearing assembly of claim 1, wherein the bearing includes an outer race and an inner race, and wherein the wheel hub at least partially constitutes the inner race.

6. The wheel bearing assembly of claim 5, wherein the seal member is arranged between the inner race and the outer race.

7. The wheel bearing assembly of claim 1, further comprising an annular polymeric lip configured to extend between the annular slinger and the annular shield.

8. The wheel bearing assembly of claim 7, wherein the annular polymeric lip is fixed relative to one of the annular slinger and the annular shield.

9. The wheel bearing assembly of claim 7, wherein the annular polymeric lip is in contact with each of the annular slinger and the annular shield and is formed from a compound configured to minimize drag between the slinger and the shield.

10. A vehicle comprising:
    a vehicle body;

a plurality of wheels for maintaining contact with a road surface; and a vehicle suspension system connecting the plurality of wheels to the vehicle body and including a wheel bearing assembly operatively connecting one of the plurality of wheels to the vehicle body, the wheel bearing assembly having:

a wheel hub attached to the one of the plurality of wheels;

a knuckle member supported by the vehicle body and defining a bore;

a bearing arranged in the bore and configured to rotatably support the wheel hub and having a seal member configured to cover internal workings of the bearing;

an annular slinger arranged on the wheel hub and configured to at least partially screen the seal member to minimize ingestion of contaminants by the bearing from the ambient; and an annular shield configured to at least partially shield the annular slinger from the contaminants and generate a labyrinth path from the ambient to the seal member for any of the contaminants;

wherein the wheel hub includes a roll form configured to retain the bearing on the wheel hub and the annular slinger is attached to the roll form via an interference fit.

11. The vehicle of claim 10, further comprising a drain passage defined by the annular shield and configured to permit the contaminants that enter the annular shield to be expelled to the ambient.

12. The vehicle of claim 10, wherein the annular shield is retained between the bearing and the knuckle member.

13. The vehicle of claim 10, wherein the annular slinger includes a plurality of tabs that are configured to snap onto the roll form.

14. The vehicle of claim 10, wherein the bearing includes an outer race and an inner race, and wherein the wheel hub at least partially constitutes the inner race.

15. The vehicle of claim 14, wherein the seal member is arranged between the inner race and the outer race.

16. The vehicle of claim 10, wherein the bearing includes an annular polymeric lip configured to extend between the annular slinger and the annular shield.

17. The vehicle of claim 16, wherein the annular polymeric lip is fixed relative to one of the annular slinger and the annular shield.

18. The vehicle of claim 16, wherein the annular polymeric lip is in contact with each of the annular slinger and the annular shield and is formed from a compound configured to minimize drag between the annular slinger and the annular shield.

* * * * *